United States Patent [19]

Newsham et al.

[11] Patent Number: 5,486,580
[45] Date of Patent: Jan. 23, 1996

[54] MESOGENIC NOVOLACS AND RESINS

[75] Inventors: Mark D. Newsham, Midland, Mich.; Jimmy D. Earls; Robert E. Hefner, Jr., both of Lake Jackson, Tex.

[73] Assignee: The Dow Chemical Company, Midland, Mich.

[21] Appl. No.: 333,897

[22] Filed: Nov. 2, 1994

[51] Int. Cl.$^6$ ............................................. C08L 61/06
[52] U.S. Cl. ..................... 525/504; 525/507; 525/531; 528/86; 528/89; 528/129; 528/153
[58] Field of Search ...................... 528/129, 86, 89, 528/153; 588/153, 720; 525/504, 507, 531

[56] References Cited

U.S. PATENT DOCUMENTS

| | | | |
|---|---|---|---|
| 3,706,619 | 12/1972 | Freeman | 156/315 |
| 3,843,230 | 10/1974 | Haas et al. | 359/77 |
| 3,959,559 | 5/1976 | Kimoto et al. | 428/394 |
| 4,072,659 | 2/1978 | Feichtinger et al. | 528/137 |
| 4,134,933 | 1/1979 | Feichtinger et al. | 525/136 |
| 4,477,512 | 10/1984 | Thomas et al. | 428/336 |
| 5,002,851 | 3/1991 | Toukhy | 430/192 |
| 5,075,409 | 12/1991 | Barthelemy et al. | 528/85 |
| 5,177,172 | 1/1993 | Toukhy | 528/153 |

FOREIGN PATENT DOCUMENTS

| | | |
|---|---|---|
| 0474402A2 | 3/1992 | European Pat. Off. . |
| 100883 | 10/1991 | Romania . |

OTHER PUBLICATIONS

Encyclopedia of Polymer Science and Engineering vol. 9, Liquid Crystalline Polymers pp. 23–41.
Derwent Abstract 89–036951.
Derwent Abstract 92–136115.

*Primary Examiner*—Nathan M. Nutter
*Assistant Examiner*—Richard Jones

[57] ABSTRACT

The present invention discloses novolacs and thermosets thereof containing mesogenic moieties. Certain of said novolacs and thermosets thereof exhibit nonlinear optical properties upon orientation.

13 Claims, No Drawings

MESOGENIC NOVOLACS AND RESINS

FIELD OF THE INVENTION

The present invention pertains to novolacs containing mesogenic moieties, some of which exhibit nonlinear optical properties as well as curable and cured compositions thereof.

BACKGROUND OF THE INVENTION

Novolacs are thermoplastic oligomers which can be prepared, for example, by the reaction of formaldehyde and phenol at molar ratios of 0.5 to 0.8 in the presence of a strong acid catalyst. The resultant novolac can be cured with a crosslinking agent, such as, for example, hexamethylenetetramine. In an additional application as a thermoset, purified versions of novolacs are employed as curing agents for epoxy resins, such as the diglycidyl ether of bisphenol A. End use applications for the novolacs include use in coating and adhesive formulations, molding compounds, laminates and composites, fibers and as precursors to novolac epoxy resins.

Nonlinear optical (NLO) materials used in electro-optic devices have in general been inorganic single crystals such as lithium niobate or potassium dihydrogen phosphate. More recently, NLO materials based on organic molecules, and in particular polar aromatic organic molecules have been developed.

Organic nonlinear optical materials have a number of potential advantages over inorganic materials. First, organic nonlinear optical materials have higher NLO activity on a molecular basis. Organic crystals of 2-methyl-4-nitroaniline have been shown to have a higher nonlinear optical activity than that of $LiNbO_3$. Second, the nonlinear optical activity of the organic materials is related to the polarization of the electronic states of the organic molecules, offering the potential of very fast switching times in electro-optic (EO) devices. The time response of the organic nonlinear optical system to a light field is on the order of 10 to 100 femtoseconds. In contrast, a large fraction of the second order polarizability in the inorganic crystals in EO applications is due to lattice vibrations in the crystal, slowing the time response of the materials. In addition, the low dielectric constant of the organic materials (e.g., 2–5 Debye at 1 MHz) compared to the inorganic materials (e.g., 30 Debye at 1 MHz) enables higher EO modulator frequencies to be achieved for a given power consumption. Third, the organic materials can be easily fabricated into integrated device structures when used in polymer form.

It is well known in the art that polymers for nonlinear optical materials must be poled to align NLO dipoles, resulting in a net noncentrosymmetric system. One of the problems with the NLO organic polymeric compositions is that there is significant molecular relaxation or reorientation over a period of time at the operating temperature of the electro-optic devices, resulting in a loss of NLO properties.

The present invention provides mesogen-containing novolacs capable of being converted to polymers which have high glass transition temperatures. Further, the present invention provides polymers which have high glass transition temperatures and exhibit stable nonlinear optical activity at operating temperatures over a period of time.

SUMMARY OF THE INVENTION

In one aspect, the present invention relates to a mesogen-containing compound, represented by the Formula I:

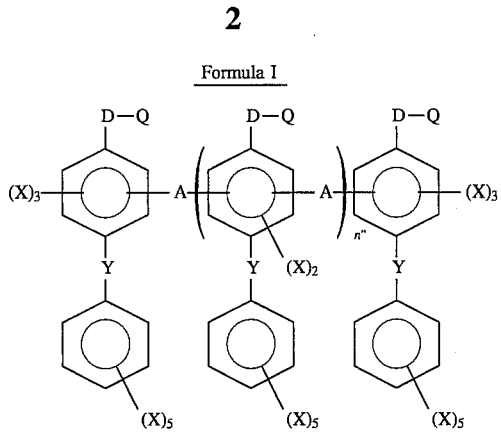

Formula I wherein A is a divalent $C_1$–$C_{12}$ aliphatic or cycloaliphatic hydrocarbyl group; D is O or NR with the proviso that when R in NR is hydrogen then Q is hydrogen or cyanamide; Q is hydrogen, epoxy, thiirane, vinylester, cyanamide or cyanate; n" has a value from 1.01 to about 10; X is hydrogen, a hydrocarbyl or hydrocarbyloxy group having from about one to about 10, preferably from one to about 4, carbon atoms, a halogen atom, preferably fluorine, chlorine or bromine, a nitro group, a phenyl group, a ketone group, an ester group, a carboxyl group with the proviso that when X is a carboxyl group then Q is hydrogen, —$SO_2R$, —$SO_2CH_2F$, —$SO_2CHF_2$, —$SO_2CF_3$, — $S(NSO_2CF_3)CF_3$, —$CF_3$, —$COCF_3$, cyano, cyanovinyl, dicyanovinyl, tricyanovinyl; with the proviso that only one X per aromatic ring can be a group other than hydrogen; R is a hydrogen or a $C_1$ to $C_{20}$, preferably hydrogen or a $C_1$ to $C_{10}$, more preferably hydrogen or a $C_1$ to $C_4$ hydrocarbyl group; and Y is a rigid central linkage group selected from —$CR^1$=$CR^1$—, —C≡C—, —N=N—, — $CR^1$=N—, —N=$CR^1$—, —O—CO—, —CO—O—, —$NR^1$—CO—, —CO—$NR^1$—, —$CR^1$=N—N=$CR^1$—, —CO—O—N=$CR^1$—, —$CR^1$=N—O—CO—, —CO—$NR^1$—$NR^1$—OC—, —$CR^1$=$CR^1$—O—OC—, —CO—O—$CR^1$=$CR^1$—, —O—OC—$CR^1$=$CR^1$—, —$CR^1$=$CR^1$—CO—O—, $(CHR^1)_{n'}$—O—CO—$CR^1$=$CR^1$—, —$CR^1$=$CR^1$—CO—O—$(CHR^1)_{n'}$—, —$(CHR^1)_{n'}$—CO—O—$CR^1$=$CR^1$—, —$CR^1$=$CR^1$—O—CO—$(CHR^1)_{n'}$—, —S—CO—, —CO—S—, —$CH_2$—$CH_2$—CO—O—, —O—OC—$CH_2$—$CH_2$—, —C≡C—C≡C—, —$CR^1$=$CR^1$—$CR^1$=$CR^1$—, —$CR^1$=C(—Cl)—, —C(—Cl)=$CR^1$—, —$CR^1$=C(—C≡N)—, —C(—C≡N)=$CR^1$—, —C(—C≡N)=N—, —N=C(—C≡N)—, —C≡C—CO—O—, —O—CO—C≡C—,

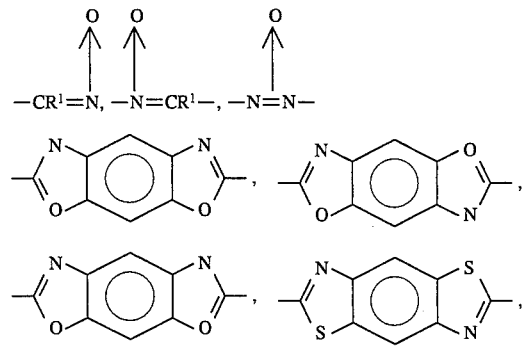

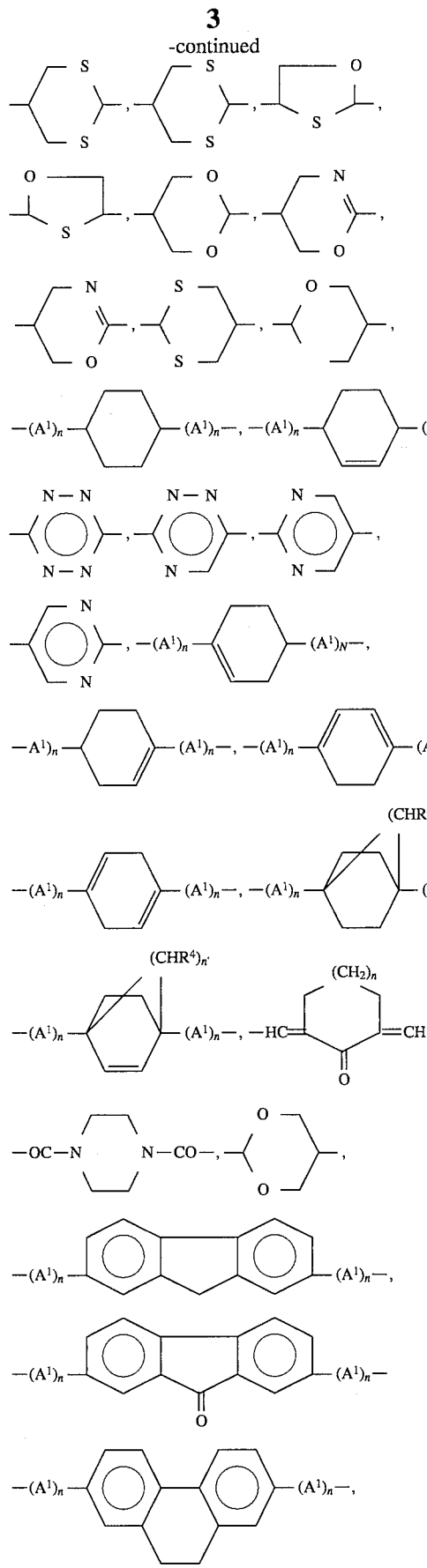

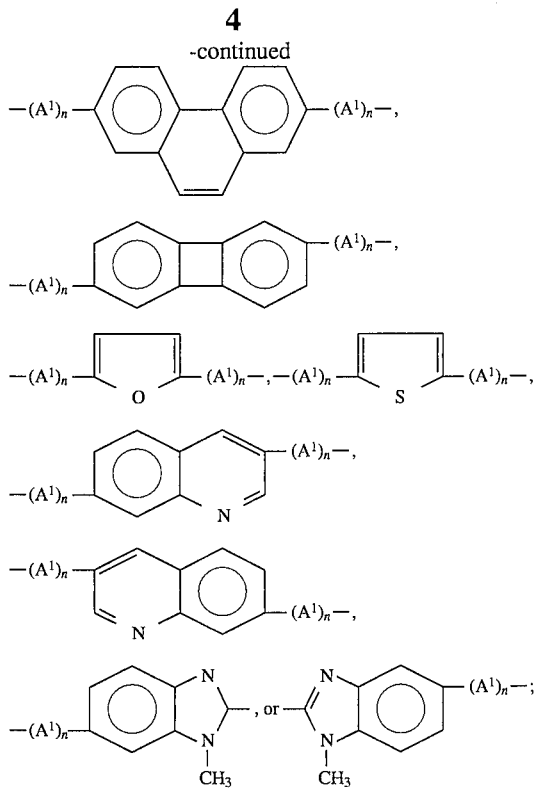

each $A^1$ is independently a

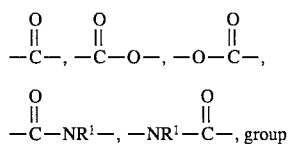

$-C-NR^1-$, $-NR^1-C-$, group;

each $R^1$ is independently hydrogen or a hydrocarbyl group having from one to about 3 carbon atoms; $R^4$ is hydrogen or a methyl group; n has a value of zero or one; and n' has a value of one or 2.

In another aspect, the present invention relates to a mesogen-containing compound, represented by the Formula II:

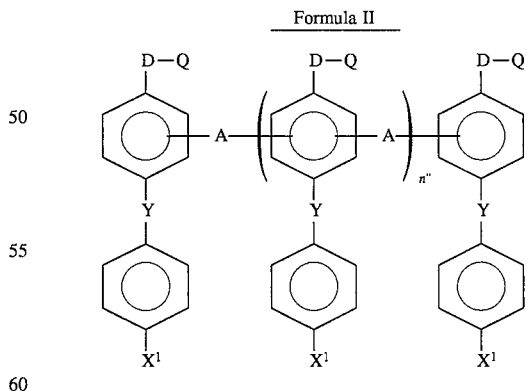

wherein A, $A^1$, D, Q, n", n', R, $R^1$, $R^4$ and Y are as hereinbefore defined and $X^1$ is a $-NO_2$, $-SO_2R$, $-SO_2CH_2F$, $-SO_2CHF_2$, $-SO_2CF_3$, $-S(NSO_2CF_3)CF_3$, $-CF_3$, $-CO_2R$, $-COCF_3$, cyano, cyanovinyl, dicyanovinyl, or tricyanovinyl group, the composition exhibiting nonlinear optical properties upon orientation.

In another aspect, the present invention relates to a crosslinked polymeric composition comprising recurring moieties derived from one or more compounds of Formula I.

In still another aspect, the present invention relates to a crosslinked polymeric composition comprising recurring moieties derived from a compound of Formula II, the polymeric composition exhibiting nonlinear optical properties upon orientation.

In still another aspect, the present invention relates to an oriented crosslinked polymeric composition derived from one or more compounds of Formula I.

In a further aspect, the present invention relates to a process for preparing an oriented crosslinked polymeric composition comprising substantially simultaneously applying an external field and thermally annealing the reaction product of (A) a compound represented by Formula II and (B) a compound capable of crosslinking the compound (A), for a period of time sufficient to form a composition having nonlinear optical properties.

The present invention can comprise, consist of, or consist essentially of, all or only a portion of the aforementioned components or reaction steps. Components or reaction steps can be eliminated singly or in multiples of any two or more.

The compositions, products or process of the present invention can be free of any component not specifically enumerated herein when desired.

DETAILED DESCRIPTION OF THE INVENTION

Definitions

The term "hydrocarbyl" as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise the term "hydrocarbyloxy" means a hydrocarbyl group having an oxygen linkage between it and the carbon atom to which it is attached.

The term "mesogenic" or "mesogen" as is used herein designates compounds containing one or more rigid rodlike structural units which have been found to favor the formation of liquid crystalline phases in the case of low molar mass substances. Thus the mesogen or mesogenic moiety is that structure responsible for molecular ordering. The term mesogenic is further defined by R. A. Weiss (ed.) and C. K. Ober (ed.) in *Liquid-Crystalline Polymers*, ACS Symposium Series 435 (1989) on pages 1–2: "The rigid unit responsible for the liquid crystalline behavior is referred to as the mesogen," and "Liquid crystalline order is a consequence solely of molecular shape anisotropy, such as found in rigid rodshaped molecules . . . ", and "Liquid crystal is a term that is now commonly used to describe materials that exhibit partially ordered fluid phases that are intermediate between the three dimensionally ordered crystalline state and the disordered or isotropic fluid state. Phases with positional and/or orientational long-range order in one or two dimensions are termed mesophases. As a consequence of the molecular order, liquid crystal phases are anisotropic, i.e., their properties are a function of direction.". Further definition of the term mesogenic can be found in *Polymeric Liquid Crystals*, Alexandre Blumstein (ed.), (1983) on pages 2–3: "Compounds forming small molecule thermotropic liquid crystals usually have the following molecular structural features; -high length:breadth (axial) ratio -rigid units such as 1,4-phenylene, 1,4-bicyclooctyl, 1,4-cyclohexyl, etc.—rigid central linkages between rings such as —COO—, —CH=CH—, —N=NO—, —N=N—, etc.—anisotropic molecular polarization".

The terms "curable" and "thermosettable" are used synonymously throughout and mean that the composition is capable of being subjected to conditions which will render the composition to a cured or thermoset state or condition.

The terms "cured" and "thermoset" are used synonymously throughout. The term "thermoset" is defined by L. R. Whittington in *Whittington's Dictionary of Plastics* (1968) on page 239: "Resin or plastic compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The term "B-stage" as employed herein designates that partial curing (partial thermosetting) of a curable composition has occurred. The term B-stage is defined in *The Epoxy Formulators Training Manual*, by The Society of the Plastics Industry, Inc. (1985) on pages 270–271 as: "An intermediate stage in the reaction of certain thermosetting resins in which the material softens when heated and swells when in contact with certain liquids, but may not entirely fuse or dissolve."

The term "orientation" as used herein refers to the alignment of molecular dipoles upon the application of an external field to a molecule or moieties derived therefrom according to methods described herein, or by some other means, such that the molecule, or the moieties derived therefrom exhibit molecular ordering. Additionally, nonlinear optical activity is exhibited when a molecule of Formula II or moieties derived therefrom according to methods described herein is oriented.

The phrase "oriented composition" as used herein refers to the compositions following orientation as described above.

The term "external field" as used herein refers to an electric, magnetic or mechanical stress field, such as, for example, drawing or shear stresses, which is applied to a substrate of mobile organic molecules to induce dipolar alignment of the molecules parallel to the field.

The term "conjugated" group, as employed herein refers to a moiety containing alternating double or triple bonds which has the ability to transfer electronic charge. Conjugated moieties generally include groups which have, for example, a hydrocarbyl diradical comprising a single aromatic ring, multiple fused rings or multiple aromatic rings linked by carbon-carbon, carbon-nitrogen, or nitrogen-nitrogen double bonds. The conjugated groups can be substituted with pendant radicals such as alkyl, aryl, cyano, halo and nitro groups.

The term "electron withdrawing", as employed herein, refers to any substituent which attracts the electrons from a conjugated electron structure, thereby providing a polarized resonating structure. A quantification of the level of electron-withdrawing capability is given by the Hammett sigma ($\sigma$) constant. This well known constant is described in many references, for instance, J. March, *Advanced Organic Chemistry*, McGraw Hill Book Company, New York, (1977 edition) pp. 251–259. The Hammett constant values are negative for electron donating groups $\sigma_p=-0.66$ for $NH_2$) and positive for electron withdrawing groups ($\sigma_p=0.78$ for a nitro group), $\sigma_p$ indicating para substitution. Preferred electron withdrawing groups are those having a Hammett constant ($\sigma_p$) of at least 0.50, and more preferably at least 0.60.

Particularly suitable electron withdrawing groups useful in the present invention include, for example, —$NO_2$, —SO$_2$R, —SO$_2$CH$_2$F, —SO$_2$CHF$_2$, —SO$_2$CF$_3$, —S(NSO$_2$CF$_3$)CF$_3$, —CF$_3$, —CO$_2$R, —COCF$_3$, cyano, cyanovinyl, dicyanovinyl, and tricyanovinyl, wherein R is a hydrogen or a C$_1$ to C$_{20}$ hydrocarbyl group.

Preparation Of Novolac Compounds

The mesogenic novolac resins of the present invention are generally prepared via reaction of a mole ratio of aldehyde compound to mesogenic phenol or aniline compound of from about 0.05:1 to about 0.99:1, preferably from about 0.2:1 to about 0.9:1, more preferably from about 0.4:1 to about 0.8:1 in the presence of an acid catalyst which is preferably present at from about 0.05 to about 10, more preferably from about 0.2 to about 3, most preferably from about 0.3 to about 1.5 weight percent based on the amount of mesogenic phenol or aniline compound employed. Suitable acid catalysts include the protonic acids, such as hydrochloric acid, sulfuric acid, phosphoric acid; metal oxides, such as zinc oxide, aluminum oxide, magnesium oxide; organic acids, such as p-toluenesulfonic acid, oxalic acid, mixtures thereof and the like. Suitable aldehyde compounds include formaldehyde, paraformaldehyde, trioxane, hexamethylenetetramine, acetaldehyde, acrolein, furfural, mixtures thereof and the like. Reaction temperatures and times vary substantially, but generally reaction times from about 30 minutes to 48 hours and reaction temperatures of from about 20° to 250° C. are employed. For reactions conducted at higher temperatures, it may be beneficial to perform said reaction under pressure, so as to prevent loss of volatile reactant(s), such as a lower boiling aldehyde. It is frequently of benefit to perform the reaction in an organic solvent, especially when a higher melting mesogenic phenol or aniline compound is employed. Suitable such solvents include formic acid, acetic acid, ethanol, mixtures thereof and the like. At the end of the reaction, it is frequently desirable to remove the acidic catalyst via neutralization, for example with an alkaline compound, such as sodium hydroxide. Likewise, at the end of the reaction, it is frequently desirable to remove any excess of phenol or aniline compound from the novolac product, for example, by distillation or extraction. Details concerning the preparation of novolacs are given by R. W. Martin, *The Chemistry of Phenolic Resins*, pages 87–116 published by John Wiley and Sons, Inc., New York (1956) which is incorporated herein by reference in its entirety. For purposes of preparing the compounds of the present invention, the various mesogenic phenols and primary and secondary aniline compounds can be substituted for the phenol and aniline compounds mentioned above.

Methods for the conversion of a phenol or aniline compound to the corresponding bis or poly(methylol) followed by reaction of said bis or poly(methylol) with additional phenol or aniline compound to give a novolac are taught by A. C. Davis, B. T. Hayes and R. F. Hunter, J. Appl. Chem. 7, pages 521–527 (September, 1957); R. F. Hunter and C. Turner, J. Appl. Chem. 7, pages 528–532 (September, 1957) and R. W. Martin, Journal of the American Chemical Society, 73, pages 3952–3954 (August, 1951) which are incorporated herein by reference in their entirety. For purposes of preparing the compounds of the present invention, the various mesogenic phenols and primary and secondary aniline compounds can be substituted for the phenol and aniline compounds mentioned above.

It is also possible to prepare the mesogenic novolacs of the present invention using alkaline catalysis in place of acid catalysis. Such methodology is taught by M. Koebner, Brit. Plastics, 14, pages 95– 101 (1942) which is incorporated herein by reference in its entirety.

Functional Groups (D-Q)

The functional group D-Q in the compositions of the invention represented by Formulas I and II act as an electron donating group. The term "electron donating" used herein refers to organic substituents which contribute π-electrons to a conjugated electronic structure. The group D-Q is a polymerizable group which can be polymerized to obtain the crosslinked polymeric compositions of the invention. The substituent D is —O— or —NR—, where R is as defined above. The substituent Q is hydrogen, epoxy, thiirane, vinyl ester, cyanamide or cyanate. When Q is an epoxy group, it

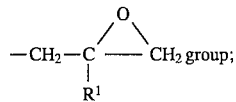

when Q is a thiirane group, it is a

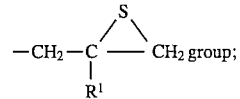

when Q is a vinylester group, it is a

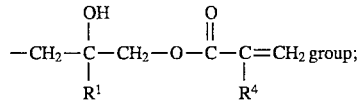

and when Q is a cyanate or a cyanamide group, it is a —C≡N group, where R$^1$ and R$^4$ are as defined above.

The epoxy functional novolac compositions of the present invention (Q=an epoxy group) can be prepared by reacting the corresponding hydroxyl or amine containing novolac with an epihalohydrin by any suitable means known to those skilled in the art. Suitable such methods are disclosed by Lee and Neville in *Handbook of Epoxy Resins*, McGraw-Hill (1967) which is incorporated herein by reference in its entirety. Generally, the hydroxy or amine containing novolac is reacted with an epihalohydrin in the presence or absence of a suitable catalyst and in the presence or absence of a suitable solvent at a temperature suitably from about 0° to about 150° C., more suitably from about 20° to about 100° C., most suitably from about 40° to about 80° C.; at pressures suitably from about 30 mm Hg vacuum to about 100 psia, more suitably from about 65 mm Hg vacuum to about 50 psia, most suitably from about 65 mm Hg vacuum to about 20 psia; and for a time sufficient to complete the reaction, usually from about 1 to about 48 hours, more usually from about 1 to about 12 hours, most usually from about 1 to about 6 hours. This initial reaction, unless the catalyst is an alkali metal or alkaline earth metal hydroxide employed in stoichiometric quantities, produces a halohydrin intermediate which is then reacted with a basic acting compound to convert the vicinal halohydrin groups to epoxide groups. Reaction of the halohydrin intermediate and basic acting compound in the presence or absence of a suitable solvent is typically conducted at a temperature suitably from 0° to about 100° C., more suitably from about 20° to 80° C., most suitably from about 40° to about 65° C.; at pressures suitably from about 30 mm Hg vacuum to about 100 psia, more suitably from about 45 mm Hg vacuum to about 50 psia., most suitably from about 65 mm Hg vacuum to atmospheric pressure; and for a time sufficient to complete the dehydrohalogenation reaction, usually from about 10 minutes to about 12 hours, more usually from about 15 minutes to about 6 hours, most usually from about 30 minutes to about 3 hours. The resulting product is the glycidyl ether or glycidyl amine novolac. Suitable epihalohydrins which can be employed to prepare the epoxidized novolacs of the present invention include, for example, epichlorohydrin, epibromohydrin, epiiodohydrin, methylepichlorohydrin, methylepibromohydrin, methylepiiodohydrin, combinations thereof and the like.

The thiirane functional novolac compositions of the present invention (Q=a thiirane group) can be prepared by converting the epoxy functional novolacs of the present invention via reaction of the epoxide groups therein with suitable sulfur containing compounds such as, for example, inorganic thiocyanates, thioureas, N-alkylbenzothiazol-2-thiones such as N-methylbenzothiazol-2-thione/trifluoroacetic acid, or a phosphine sulfide such as triphenylphosphine sulfide/trifluoroacetic acid. Reaction conditions for the conversion of the epoxide group to the thiirane group are given by Bell and Ku in the article "Epoxy/Episulfide Resins", pages 3–26 and by Vecera and Spacek in the article "Preparation and Reactivity of Thiiranes", pages 73–80, both published in *Crosslinked Epoxies*, Sedlacek and Kahwec (editors), by Walter de Gruyter, New York (1987); Chan and Finkenbine, Journal of the American Society, 94, 2880 (1972) and Calo, Lopez, Marchese and Pesce, Journal of the Chemical Society, Chemical Communications, 612 (1975), all of which are incorporated herein by reference. The reaction is usually conducted at temperatures of from about 5° to about 100° C., preferably from about 20° to about 60° C., for a time sufficient to complete the reaction, usually from about one to about 48 hours, preferably from about 4 to about 24 hours. The higher reaction temperatures typically require shorter times whereas the lower reaction temperatures typically require longer times to complete the reaction.

The vinyl ester novolacs of the present invention (Q=a vinyl ester group) can be prepared by reacting the epoxy functional novolacs of the present invention with monounsaturated monocarboxylic acid compounds such as, for example, acrylic acid, methacrylic acid, cyanoacrylic acid, crotonic acid, methoxyacrylic acid, alpha-phenylacrylic acid, monomethylester of maleic acid, monomethylester of fumaric acid, mixtures thereof and the like. Methacrylic acid is most preferred as the monounsaturated monocarboxylic acid. A mole ratio of 0.9 to 1.1 of monounsaturated monocarboxylic acid per epoxide group is preferred, with a ratio of 0.95 to 1.00 being most preferred.

The reaction between the epoxide group and the carboxylic acid group is typically performed in the presence of one or more catalysts. Chromium trichloride and tris(dimethylaminoethyl)phenol are most preferred as catalysts. A quantity of from about 0.01 to about 2 percent by weight of the total reactants used has been found to be a suitable quantity of catalyst with concentrations of 0.1 to 0.3 weight percent of the total reactants used being most preferred.

A suitable process inhibitor is typically used in the reaction between the epoxide group and the carboxylic acid group to prevent gelation (homopolymerization of the vinyl ester and/or copolymerization of the vinyl ester with unreacted monounsaturated monocarboxylic acid). Hydroquinone activated with air is a most preferred inhibitor at concentrations of from about 100 to 500 ppm based on the weight of the total reactants used.

The reaction to produce the vinyl ester novolacs of the present invention is optionally conducted in one or more organic solvents inert to the reactants. The term "inert" as applied to the organic solvent means that little, if any, reaction between the epoxidized novolac, the vinyl ester thereof and the monounsaturated monocarboxylic acid with the solvent occurs under the reaction conditions employed. Typical of the inert organic solvents are the aliphatic ketones, such as methylisobutylketone, the chlorinated aliphatics, such as perchloroethylene and the aromatic hydrocarbons, such as toluene.

The reaction to produce the vinyl ester novolacs is usually conducted at temperatures of from about 50° to about 125° C., preferably from about 80° to about 120° C., for a time sufficient to complete the reaction, usually from about 90 minutes to about 720 minutes, preferably from about 120 to about 420 minutes. Although reaction times and reaction temperatures can vary substantially, most preferred vinyl ester compositions are produced by reacting to a specific conversion, typically 1.5 to 0.25 percent carboxylic acid.

The cyanate and cyanamide novolacs of the present invention (Q =a cyanate or cyanamide group) can be prepared by reacting a stoichiometric quantity up to a slight stoichiometric excess (up to about 20 percent excess) of a cyanogen halide with a hydroxyl or amine containing novolac of the present invention (D=—O— or —NR—, and Q=—H) in the presence of a basic compound. Suitable cyanogen halides include cyanogen chloride and cyanogen bromide. Alternately, the method of Martin and Bauer described in *Organic Synthesis*, volume 61, pages 35–68 (1983) published by John Wiley and Sons, which is incorporated herein by reference, can be used to generate the required cyanogen halide in situ from sodium cyanide and a halogen such as chlorine or bromine. Suitable basic compounds include both inorganic and organic bases and tertiary amines, such as sodium hydroxide, potassium hydroxide, trimethylamine, triethylamine, mixtures thereof and the like. Triethylamine is most preferred as the basic compound. Suitable solvents for the cyanation or cyanamidation reaction include water, aliphatic ketones, chlorinated hydrocarbons, aliphatic and cycloaliphatic ethers and diethers, aromatic hydrocarbons, mixtures thereof and the like. Acetone, methylethylketone, methylene chloride and chloroform are particularly suitable as the solvent. Reaction temperatures of from about −40° to about 60° C. are operable, with reaction temperatures of −15° to 10° C. being preferred. Reaction times can vary substantially, for example, as a function of the reactants being employed, the reaction temperature, solvent(s) used, the scale of the reaction, and the like, but are generally between 15 minutes and 4 hours, with reaction times of 30 to 90 minutes being preferred.

In the instances where Q is a hydrogen, the novolac compositions of the present invention can be used as curing agents for di- and polyepoxides and di and polythiiranes to obtain crosslinked polymeric compositions of the present invention according to methods well known to those skilled in the art of epoxy resins. See, for example, *Encyclopedia of Polymer Science and Technology*, 2nd Edition, pp. 323–331. Di- and polyepoxides which can be employed in the practice of this invention include, for example, diglycidyl ethers of: 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzo-phenone, 3,3',5,.5-tetrabromoisopopylidenebisphenol, 4,4'-dihydroxybiphenyl, 4,4'-dihydroxydiphenyl oxide, bis(4-hydroxyphenyl)methane, α,α-bis(4-hydroxyphenyl)etherbenzene, 2,6-dihydroxynapthalene, 4,4'-isopropylidenediphenol (bisphenol A), 4,4'-dihydroxydiphenyl methane (bisphenol F), 4,4' -dihydroxy-α-methyl-stilbene, any combination thereof and the like. Preferred diglycidyl ethers are diglycidyl ethers of 4,4'-isopropylidenediphenol (bisphenol A), 4,4'-sulfonyldiphenol, 4,4'-dihydroxydiphenyl oxide, 4,4'-dihydroxybenzophenone, 4,4'-dihydroxy-α-methylstilbene, and 9,9-bis(4-hydroxyphenyl)fluorene, and combinations thereof. Particularly suitable are the commercially available epoxy resins such as, for example, D.E.R.™ 331, D.E.R.™ 332, D.E.R.™ 383, D.E.R.™ 431, D.E.R.™ 736, D.E.R.™ 661, Tactix™ 742, all commercially available from The Dow Chemical Company.

Curing Epoxy and Thiirane Compositions

In the instances where Q is an epoxy or thiirane, the epoxy or thiirane compositions of the invention can be cured with at least one curing agent by methods well known in the art. Such curing agents include, for example, aliphatic, cycloaliphatic or aromatic di- and polycarboxylic acids and their anhydrides; aliphatic, cycloaliphatic or aromatic di- and poly primary and secondary amines; phenolic hydroxyl-containing compounds; guanidines; biguanides; or any combination thereof and the like. Particularly suitable curing agents include, for example, ethylenediamine, diethylenetriamine, triethylenetetramine, tetraethylenepentamine, sulfanilamide, 4,4'-diaminodiphenylsulfone, 4,4'-dihydroxydiphenylsulfone, 4,4'-isopropylidenediphenol, 4,4'-diaminodiphenyl methane, maleic anhydride, adipic acid, diaminocyclohexanes, diethyltoluenediamine, 4,4'-dihydroxy-α-methylstilbene, 4,4'-dicarboxystilbene, chlorendic anhydride, methyl bicyclo[2.2.1]heptene-2,3-dicarboxylic anhydride, 3,3',5,5'-tetrabromo- 4,4'-isopropylidenediphenol, combinations of any two or more such compounds thereof and the like.

The curing agents are employed in an amount which will effectively cure the composition containing the epoxidized novolac. These amounts will depend upon the particular epoxidized novolac and curing agent employed; however, suitable amounts include, for example, from about 0.9 to about 1.2, suitably from about 0.95 to about 1.15, more suitably from about 0.99 to about 1.05 equivalents of curing agent per epoxide equivalent for those curing agents which cure by reacting with the epoxy group of the epoxidized novolac. The *Handbook of Epoxy Resins* by Lee and Neville, McGraw-Hill, 1967 contains various discussions concerning the curing of epoxy resins as well as compilation of suitable curing agents. This handbook is incorporated herein by reference.

The curing agent can also be a compound which exhibits a NLO response. Exemplary of such curing agents which exhibit a NLO response include, for example, 4,4'-diaminodiphenylsulfone, p-nitroaniline, nitrobenzyl amine, Disperse Orange, methyl nitroaniline, amino nitropyrimidine, 2,6-diamino-4-nitrotoluene, 5-nitrobenzotriazole, and combinations thereof.

Curing Vinyl Ester Compositions

In the instances where Q is a vinyl ester, the vinyl ester compositions of the invention can be cured by the application of heat and/or pressure in the presence of a free radical forming catalyst, as is well known in the art. Catalysts that can be used for the curing or polymerization are preferably the peroxide catalysts, such as, for example, benzoyl peroxide, lauroyl peroxide, t-butylhydroperoxide, methylethylketone peroxide, t-butyl-perbenzoate, potassium persulfate, mixtures thereof and the like. The amount of catalyst added will vary from 0.1 to about 2 percent by weight, preferably from 0.75 to 1.5 percent by weight based on the weight of the vinyl ester composition. Temperatures employed can vary over a considerable range but usually are in the range of 20° C. to 250° C., preferably from about 20° C. to about 200° C., more preferably from about 20° C. to about 150° C. Additionally, more rapid curing of the vinyl ester compositions can be accomplished by the addition of accelerating agents such as lead or cobalt naphthenate, N,N-dimethylaniline, mixtures thereof and the like, usually in concentrations ranging from 0.01 to about 2 percent by weight, preferably 0.05 to 0.5 percent by weight based on the weight of the vinyl ester composition.

Polymerizable Ethylenically Unsaturated Monomers

It is frequently advantageous to dilute the vinyl ester with one or more polymerizable ethylenically unsaturated monomers. Polymerizable mixtures of the vinyl ester compositions can consist of from 1 to 99, preferably from about 20 to about 80, most preferably from about 30 to about 70 percent by weight of one or more polymerizable ethylenically unsaturated monomers with the balance of the combined weight consisting of said vinyl ester. Suitable polymerizable ethylenically unsaturated monomers which can be employed herein can be selected from the many known classes of polymerizable vinyl monomers. Suitable such monomers include, for example, the vinyl aromatic compounds which include such monomers as styrene, alpha-methylstyrene, vinyl toluenes, halogenated styrenes, t-butylstyrenes, divinylbenzenes, vinyl naphthalenes and the like. Other suitable monomers include the methyl, ethyl, isopropyl, octyl, hydroxyethyl, hydroxypropyl, etc. esters of acrylic and methacrylic acid; acidic monomers such as acrylic acid, methacrylic acid and crotonic acid; amide monomers such as acrylamide and N-alkylacrylamides; allyl monomers such as diallylphthalate, triallylisocyanurate, diallylmaleate and dimethallylfumarate; the vinyl aliphatic compounds such as vinyl acetate mixtures thereof and the like.

Curing of Cyanate and Cyanamide Compositions

In the instances where Q is a cyanate or cyanamide, the cyanate or cyanamide compositions of the invention can be cured (cyclotrimerized) by heating from 50° C. to 350° C. or more, preferably by heating from 70° C. to 200° C., and optionally, but preferably, in the presence of from about 0.001 to about 5 percent by weight of a suitable trimerization catalyst. Operable trimerization catalysts include those taught by Oehmke in U.S. Pat. No. 3,694,410 and by Sundermann, et al in U.S. Pat. No. 4,094,852 which are incorporated herein by reference in their entirety. Most preferred trimerization catalysts are cobalt naphthenate, cobalt acetylacetonate and cobalt octoate. Prepolymerization (B-staging) can be effected by using lower reaction temperatures and/or shorter reaction times. Cyclotrimerization of the prepolymerized product can then be completed at a later time or immediately following prepolymerization to comprise a single cyclotrimerization step.

Other Additives

The compositions of the invention can be blended with other materials, such as solvents or diluents, fillers, pigments, dyes, flow modifiers, thickeners, reinforcing agents, mold release agents, wetting agents, stabilizers, fire retardant agents, surfactants, or any combination thereof and the like. Reinforcing agents which can be employed herein include natural and synthetic fibers in the form of woven fabric, mats, monofilament, multifilament, unidirectional fibers, rovings, random fibers or filaments, inorganic fibers or whiskers, hollow spheres, and the like. Suitable reinforcing materials include, for example, glass, ceramics, nylon, rayon, cotton, aramid, graphite, polyalkylene terephthalates, polyethylene, polypropylene, polyesters or any combination thereof and the like. Suitable fillers which can be employed herein include, for example, inorganic oxides, ceramic microspheres, plastic microspheres, glass microspheres, or any combination thereof and the like.

The compounds of the invention can be employed in coating, casting, encapsulation, electronic, or structural laminate or composite, filament winding, molding and the like applications. The compositions of the invention can be used in the form of sheets, films, fibers or other shaped articles formed by conventional techniques. Preferably, films prepared using the compositions of Formula II are used in electro-optic devices and waveguide applications.

The mesogenic novolacs of Formula II exhibit nonlinear optical properties when subjected to a suitable poling force such as an electric field. Electric Field Induced Second Harmonic Generation (EFISH(G)) has been used to determine the dipole moment-hyperpolarizability product, $\mu\beta$, of the novolacs. The methodology used is described by B. F. Levine and C. G. Bethea, J. Chem. Phys. 63, pages 2666–2682, (1975), which is incorporated herein by reference in its entirety.

The EFISH technique is well-known to those skilled in the art. The second harmonic generation (SHG) signal is measured using a solution containing a small concentration of the material under study. The solution is in a cell which contains electrodes which allow orientation of dipolar moieties when an electric field is applied. Typically, the applied electric field is about 5000 V. A study of the SHG signal from a number of solute concentrations versus the SHG signal from a quartz reference crystal yields the NLO activity. This activity is measured as the $\mu\beta$ product. Typically, the fundamental wavelength used for the measurement is about 1064 nm or about 1579 nm.

Methods of fabricating films of NLO polymers and the methods of characterization of NLO activity are well known to those skilled in the art. Films are typically fabricated by spin-coating, dip-coating, or spray-coating a solution, in a suitable solvent, of a polymerizable mixture of (A) a compound of Formula II and (B) a compound capable of crosslinking compound (A), or of the prepolymer prepared therefrom, onto a substrate. The substrate can be any material suitable for device testing and use. Suitable substrates include glass microscope slides, indium-tin-oxide (ITO) coated glass, and silicon wafers. Solution concentrations can range from about 5 to about 75 percent by weight, preferably from about 15 to about 40 weight percent, and more preferably from about 25 to about 35 percent by weight.

The films used for testing electro-optic devices and waveguides should be thin films. Generally, the film has a thickness of from about 0.5 μm to about 500 μm. Preferably, the thickness of the film is from about 1 μm to about 25 μm. The preferred method of film fabrication is spin coating. Typical spin speeds used are from about 500 to about 3000 rpm.

The fabricated NLO film must have a non-centrosymmetric alignment of the dipolar segments throughout the bulk of the polymer film. The orientation of the dipolar segments in the film can be achieved by applying an external field such as an electric field, magnetic field, of mechanical field. Typically, orientation is achieved by applying an electric field across the film ("poling").

In the instances where the external field is an electric field, corona or parallel plate poling can be used. The corona poling technique is described by M. A. Mortazavi, et al., J. Opt. Soc. Am. B, 6, pages 733–741 (1989), which is incorporated herein by reference in its entirety. In corona poling, the electric field results from a discharge between a wire, such as tungsten, suspended above the film and a grounded heater block. The discharge is created by applying about 3000 to about 6000 V to the needle, which is typically suspended about 0.5 to about 2 cm above the film. Air is ionized and positively charged ions coat the polymer surface. A potential difference results between these charges and the grounded heater block. This potential difference is used to orient the dipolar chromophores in the polymer film.

In parallel plate poling, a voltage is applied across two electrode layers. The film is typically coated on a conductive substrate such as ITO coated glass or silicon, and a top electrode, such as gold, is applied on top of the film by evaporation techniques such as sputter coating. An electric field of about 5 to 200 volts per micrometer (V/μm) is applied across the two electrodes to induce the orientation.

In both corona and parallel plate poling, the poling voltage is applied at elevated temperatures, near the polymer Tg (approximately 5°–10° C. above the Tg). For corona poling, the current is maintained at about 1 to about 5 microamps (μA) by controlling the voltage on the needle. The field is left on for at least a few minutes and the sample is cooled with the field on to maintain the orientation of the dipolar segments.

Another method for orienting of the polymeric composition of the present invention for producing nonlinear optical materials includes polymerizing the prepolymer of a crosslinked polymeric composition of the invention while the prepolymer is under an electric field such that the nonlinear optical moieties are aligned in the electric field before complete polymerization of the prepolymer takes place. This method of orientation will produce less stress on the ultimate polymer network than if the electric field is applied after the NLO moieties are incorporated into the backbone of the polymer.

Still another method for preparing thin films for nonlinear optical applications includes annealing of the polymer while simultaneously poling the polymer which will allow relaxation of the polymer around the oriented molecule. After the polymer has been poled as described above, the temperature is reduced from about 10° C. to about 30° C. below the Tg and maintained at this lower temperature to allow for densification. This "annealing" step is carried out so as to cause a reduced free volume in the film and thus less room for NLO moieties to randomly reorient themselves which can lead to a decrease in the NLO signal. Thus, this annealing process during polymer orientation can advantageously improve the stability of the polymer.

The Maker Fringe Rotation technique is a conventional procedure used herein to determine the NLO activity of poled NLO films. In accordance with this test procedure, the magnitude of the intensity of the light generated at the second harmonic of the incident frequency by the polymeric film sample can be measured as a function of the incident angle of the light irradiating from the sample. If the film is positioned such that the oriented dipolar segments have a net orientation normal to the surface the largest second harmonic coefficient, $d_{33}$, can be determined using p-polarized incident radiation.

Typically, a Q-switched Nd:YAG laser which emits electromagnetic radiation at 1064 nm, has a pulse half width of 14 ns, a repetition rate of 10 Hz, and is p-polarized, is focused onto a sample on the rotation axis of a rotary stage. Alternatively, 1579 nm radiation can be used by Raman shifting 532 nm light from a frequency doubled Nd:YAG laser to the third Stokes line (1579 nm). The 1579 nm light is spatially separated from the more intense first and second Stokes lines using a Pellin-Broca prism and aperture. The light emitted from the sample is filtered to remove the incident radiation with a spike filter, centered near the second harmonic, to allow passage of substantially only the second harmonic. The light is detected by a photomultiplier and averaged by a boxcar integrator which is triggered by the incoming laser pulse. The averaged output of the boxcar is collected by a computer as a function of the angle of incidence of the incident beam on the sample.

The second harmonic coefficient ($d_{33}$) is calculated using the equations described by Singer et al., Appl. Phys. Lett., 49, pages 248–250 (1986). The incident density on the sample is obtained by calibration with a known quartz sample. A Y-cut quartz slab is placed on the rotation stage in the same position as the polymer sample to be tested. The energy density is calculated knowing the $d_{11}$ value of quartz at 1064 or 1579 nm. The intensity as a function of incident angle for the polymer test sample is then fit by the computer with the additional information of incident energy density, film thickness, and indices of refraction at the incident and second harmonic wavelengths.

The present invention is further illustrated and understood by reference to the following non-limiting examples in which all parts and percentages are on a weight basis unless otherwise specifically indicated.

EXAMPLE 1

A. Synthesis of α-p-Nitrophenyl-p-acetoxycinnamic Acid p-Nitrophenylacetic acid (0.60 moles, 108.69 grams) is added to a one liter glass beaker containing stirred aqueous sodium hydroxide solution (24.0 grams, 0.06 mole diluted with deionized water to a total volume of 600 mL) followed by heating to 60° C. The resultant solution is rotary evaporated under vacuum until final conditions of 100° C. and one mm Hg are achieved and maintained for 30 minutes. A portion (99.08 g, 0.4877 mole) of the recovered dry, white carboxylic acid sodium salt, p-hydroxybenzaldehyde (59.56 g, 0.4877 mole) and acetic acid (250 g) are added to a reactor equipped with a reflux condenser and stirred under a nitrogen atmosphere at a 145° C. reflux. Refluxing is continued over the next 18 hours after which time, the reactor is cooled to 100° C. and ethanol (300 mL) and deionized water (50 mL) are added. The resultant slurry is boiled at 89° C. for one hour followed by cooling to 50° C. and filtered. The filtrate is added to deionized water (1500 mL) and the resultant precipitate recovered by filtration. The precipitate is exhaustively extracted with deionized water saturated with sodium carbonate. The combined extracts are filtered and neutralized with concentrated aqueous hydrochloric acid inducing formation of a precipitate. The precipitate is recovered by filtration and dried at 50° C. in a forced air, convection type oven. The dried powder is added to a beaker along with carbon tetrachloride (200 mL) and stirred with heating to a boil. Acetic acid (40 mL) is added to the boiling slurry and allowed to boil. Once boiling is achieved, the slurry is allowed to cool to room temperature (23° C.) and then at 4° C. for 16 hours. The product is recovered by filtration and dried at 70° C. under a vacuum of 5 mm Hg to a constant weight of 39.1 grams of brilliant, light yellow colored, crystalline powder.

B. Synthesis Of 4-Nitro-4'-hydroxystilbene

A portion (25.8 g) of the α-p-nitrophenyl-p-acetoxycinnamic acid from A above, ethanol (250 mL) and concentrated hydrochloric acid (250 mL) are added to a reactor equipped with a reflux condenser and stirred under a nitrogen atmosphere. Heating commences and after 27 minutes, a refluxing solution is obtained. Refluxing is continued over the next 13 minutes at which time the temperature has increased to 91° C. and an orange slurry has formed. After an additional 63 minutes, the temperature has increased to 92° C. and at this time, the contents of the reactor are poured into deionized water (800 mL) and the resultant precipitate recovered by filtration. The wet filter cake is sequentially washed with two portions (400 mL) of deionized water and dissolved in stirred ethanol (525 mL) maintained at 82° C. The resultant solution is maintained at 4° C. for 16 hours followed by filtration. The recovered product is dried at 75° C. under a vacuum of 2 mm Hg to a constant weight of 16.1 grams of light orange colored needles. A second crop of crystalline product which is formed is not recovered. Fourier transform infrared spectrophotometric analysis of a potassium chloride pellet of the product reveals the presence of the expected hydroxy group O—H stretching absorbance centered at 3429 $cm^{-1}$ (broad), conjugated nitro group absorbances at 1523 and 1337 (1317 shoulder) $cm^{-1}$ (sharp) and the ethylene C—H out-of-plane deformation at 972 $cm^{-1}$. Differential scanning calorimetry of portions (6.8 and 6.7 mg) of the 4-nitro-4'-hydroxystilbene product using a heating rate of 10° C. per minute from 30° to 250° C. under a stream of nitrogen flowing at 35 cubic centimeters per minute reveals a single sharp melting point endotherm centered at 209.4° C. with an enthalpy of 127.5 joules per gram. High pressure liquid chromatographic analysis of the 4-nitro-4'-hydroxystilbene product using a UV detector set at 254 nm reveals a single sharp peak.

C. Synthesis of 4-Nitro-4'-hydroxystilbene Novolac (II)

A portion (0.0652 moles, 12.80 g) of the 4-nitro-4'-hydroxystilbene from B above and 90 percent formic acid (1000 mL) are added to a reactor equipped with a chilled (5° C.) glycol condenser and stirred as a slurry under a nitrogen atmosphere. Concentrated hydrochloric acid (0.256 g) is added, followed by 37 percent aqueous formaldehyde (2.656 g), and heating commences. Once a temperature of 70° C. is achieved, samples of the reaction mixture are removed and analyzed by high pressure liquid chromatography ($C_{18}$ column, 254 nm UV detector, 45 percent/55 percent acetonitrile/deionized water initial eluent to 100 percent acetonitrile final eluent at 0.7 mL per minute over 10 minutes total program time using a linear gradient) for conversion of the 4-nitro-4'-hydroxystilbene to the novolac. After 19 hours at the 70° C. temperature, 72 area percent of the 4-nitro-4'-hydroxystilbene is converted to the novolac. After 21 hours at the 70° C. temperature, the reaction temperature is increased to 80° C. After a total of 27 hours of reaction, 93.8 area percent of the 4-nitro-4'-hydroxystilbene is converted to the novolac.

The reaction product is then cooled to 25° C., filtered through a medium porosity fritted glass funnel. The product recovered on the filter is washed with two portions (100 mL each) of deionized water, then dried at 110° C. under a vacuum of 1 mm Hg to a constant weight of 13.1 g of bright orange colored powder. Gel permeation chromatographic analysis (103 Å, 500 Å and 100 Å columns of polystyrene crosslinked with divinylbenzene, refractive index detector, tetrahydrofuran eluent at 1.0 mL per minute) of a portion of the novolac product is completed using calibration based on polystyrene standards with molecular weights of 2980 and 9110 plus 4-nitro-4'-hydroxystilbene. Using this method, analysis of the 4-nitro-4'-hydroxystilbene provides a number average molecular weight of 202, a weight average molecular weight of 203, a molecular weight at peak maximum of 209 and a polydispersity of 1.005. Analysis of the novolac product provides a number average molecular weight of 1621, a weight average molecular weight of 2159, a molecular weight at peak maximum of 1782 and a polydispersity of 1.332. Fourier transform infrared spectrophotometric analysis of a potassium chloride pellet of the novolac reveals the presence of the expected hydroxyl group OH stretching absorbance centered at 3469 cm$^{-1}$ (broad), conjugated nitro group absorbances at 1516 and 1344 cm$^{-1}$ (sharp) and the ethylene C—H out-of-plane deformation at 965 cm$^{-1}$.

D. Synthesis of 4-Nitro-4'-hydroxystilbene Novolac Epoxy Resin (III)

A portion (6.247 g) of the 4-nitro-4'-hydroxystilbene novolac from C above, epichlorohydrin (138.8 g, 1.5 moles) and tetra-n-butylammonium bromide (0.0625 g) is added to a 250 mL glass three necked round bottom reactor and stirred under a nitrogen atmosphere as a solution. Heating commences until a temperature of 55° C. is achieved and this temperature is maintained for the next 465 minutes. At this time, a water separator is interspersed between the reactor and the chilled (− 2.5° C.) glycol condenser and an addition funnel containing sodium hydroxide (1.35 g, 0.03 mole) dissolved in deionized water (1.65 g, 55 percent weight of the solution) and a vacuum line are added to the reactor. The nitrogen purge is shut off simultaneously with the initiation of the vacuum. The vacuum and reaction temperature are equilibrated 50° C. and 125 mm Hg, respectively, such that a vigorous reflux is maintained with continuous return of dry epichlorohydrin from the water separator. After equilibration, aqueous sodium hydroxide is added dropwise with maintenance of the reaction temperature and vacuum. After about 12 minutes, addition of the aqueous sodium hydroxide is complete. The heating is continued for an additional 2 hours at the aforementioned reaction temperature and vacuum, and the recovered warm product slurry is filtered through a bed of diatomaceous earth. The recovered filtrate is added to a separatory funnel and washed with deionized water (100 mL). The recovered organic layer rotary is evaporated under a vacuum (1 mm Hg final conditions) at 110° C. for one hour to a constant weight of 6.89 g of an orange colored powder. Titration of a portion of this product reveals the presence of 10.38 percent epoxide (414.76 epoxide equivalent weight). Fourier transform infrared spectrophotometric analysis of a potassium chloride pellet of the novolac reveals the presence of hydroxyl group O—H stretching absorbance centered at 3462 cm$^{-1}$ (broad), conjugated nitro group absorbances at 1516 (shoulder at 1497 cm$^{-1}$ due to aromatic ring C=C stretching vibration) and 1344 cm$^{-1}$ (sharp), the ethylene C—H out-of-plane deformation at 965 cm$^{-1}$, epoxide ring C—O stretching vibrations at 912 and 832 (as a shoulder on the 852 cm$^{-1}$ absorbance, one of the C—H out-of-plane vibrations for the aromatic rings) cm$^{-1}$.

EXAMPLE 2

NLO Activity Of II

The second-order NLO activity of II is determined in solution using the Electric Field Induced Second Harmonic Generation (EFISH(G)) technique. A pulsed voltage of 5000 V is applied to electrodes in a solution cell with 2 mm electrode separation. The 5000 V pulses are synchronized with the firing of the laser (25 Hz). The input and output windows are sandwiched between the electrodes to achieve a wedge angle of 3.08° across the cell. The second harmonic generation (SHG) signal created by the solution is detected at a photomultiplier and is measured over a range of solution concentrations and normalized to the signal from a quartz reference wedge. The $\mu\beta$ product for II is determined from the SHG data as described by Levine and Bethea, supra. The excitation wavelength used is 1579 nm, which is obtained by Raman shifting (in H$_2$ gas at 400 psi) the 532 nm frequency doubles (using a KDP crystal) output of a QuantaRay DCR-2a Nd:YAG laser. The $\mu\beta$ product obtained per 4-nitro-4'-hydroxystilbene repeat unit is 68×10$^{-48}$ esu.

EXAMPLE 3

A. Preparation of a Film of a Polymer of III/4,4'-Diaminodiphenyl sulfone (IV)

A mixture of III (2.01 g, 4.9 meq), 4,4'-diaminodiphenyl sulfone (DADS) (0.31 g, 5.0 meq) and 5 mL dimethylacetamide (DMAc) is prepared in a sample vial. Prior to use, the DMAc is shaken with BaO for 24 hours, vacuum distilled over BaO, and stored in a N$_2$ purged alumina column to remove residual water from the solvent. The resulting solution is used for spin coating films onto indium tin oxide (ITO) substrates. Films are cast by spinning for 40 seconds at 1000 rpm.

The films are air dried for 48 hours and dried in a N$_2$ purged clean room oven at 100° C. for 1 hour. The films are then dried in a vacuum oven for 1 hour at 100° C. and 1 hour at 150° C. The resulting films are about 1.1 μm thick as measured by profilimetry. Finally, a gold electrode (about 250 Å) is deposited on top of the films by sputter coating.

B. Poling/Curing

The films are simultaneously cured and parallel plate poled in a nitrogen atmosphere. The film is placed on a heating block and the following cure schedule is used: 1 hour at 180° C., ramped to 210° C. in about 2 minutes, 10 minutes at 210° C. After the film reaches 180° C., the poling field of 50 V/μm is applied. After this poling/curing process, the gold electrode is etched off for the NLO measurement.

C. Measurement of NLO Activity

The NLO activity is determined by using the Maker Fringe Rotation technique. The second harmonic coefficient, $d_{33}$, is obtained from the measurement. The fundamental wavelength of 1579 nm is obtained by Raman shifting the 532 nm line from a Nd:YAG laser and the reference material is quartz. Analysis of the Maker fringes by using Singer's method gives a $d_{33}$ value of 5.9×10$^{-9}$ esu.

EXAMPLE 4

A. Preparation of a Film of a Polymer of II/Diglycidyl ether of 9,9 -bis(4-hydroxyphenyl)fluorene (V)

A mixture of II (1.949 g, 7.67 meq), the diglycidyl ether of 9,9-bis(4-hydroxyphenyl)fluorene (1.793 g, 7.73 meq), ethyltriphenylphosphonium iodide (20.0 mg) and DOWANOL* DPM/cyclohexanone (5 mL/5 mL) is prepared in a reaction vial. After degassing with nitrogen for ~1 hour, the solution is heated at 124° C. for ~2 hours and at 150° C. for ~1 hour. The resulting solution is a dark reddish-orange color and is used for spin coating films onto ITO substrates. Films are cast by spin coating: 1) spread cycle=500 rpm for 5 seconds and 2) spin cycle=1000 rpm for 20 seconds.

The films are air dried for ~72 hours and dried in a N$_2$ purged clean room oven at 100° C. for 2 hours. The films are then dried in a vacuum oven for 2 hours at 100° C. and 1 hour at 150° C. Finally, the films are dried for 2 hours at 190° C. and 1 hour at 210° C. in a nitrogen purged oven. The resulting films are about 3.67 μm thick as measured using a Tencor Instruments Alpha Step 200 profilimeter. Finally, a gold electrode (about 250 Å) is deposited on top of the films by sputter coating.

B. Poling/Curing

The films are parallel plate poled in a nitrogen atmosphere at 230° C. for 4 minutes using a poling field of 100 V/μm.

C. Measurement of NLO Activity

The NLO activity as measured by the electro-optic coefficient ($r_{33}$) is determined by using a thin film reflection technique as taught by C. C. Teng and H. T. Man, Appl. Phys. Lett. 56, pages 1734–1736 (1990), which is incorporated herein by reference in its entirety. The basis of the measurement is that the modulated phase shift of light due to an applied electric field by the linear electro-optic effect can be related to a phase shift imparted by a Soleil-Babinet compensator. The value can be calculated using the equation:

$$r_{33} = \frac{3\lambda I_m (n^2 - \sin^2\theta)^{3/2}}{4\pi V_m I_c n^2 (n^2 - 2\sin^2\theta)\sin^2\theta}$$

where $\lambda$ is the wavelength of light, $I_m$ is the intensity of the modulated light signal, n is the refractive index of the polymer, $V_m$ is the amplitude of the applied voltage sine wave, and $I_c$ is the light intensity at the intensity half point corresponding to a $\pi/2$ phase shift by the Soleil-Babinet compensator.

A Lasermax Model LAS-300-830-15 830 nm diode laser is the light source. A Stanford Research Systems Model SR540 Chopper Controller is used to chop the light at 1030 Hz and is used to drive the voltage wave applied to the sample. A voltage sine wave is generated by a BK Precision Dynascan Corp. 3030 Sweep Function Generator and amplified by a Lasermetrics Model AF3 amplifier and applied to the sample. For the 12.4 V sine wave, the signal from the sweep generator is minimized and a 10 dB attenuator is employed. The signal is detected by a silicon photodiode detector and analyzed with an EG&G Princeton Applied Research Model 124A Lock-In Amplifier and Model 116 Differential Amplifier. A Melles Griot Soleil-Babinet compensator is translated to vary the phase of the light to yield a half intensity point of the chopped incident light. The chopper is removed from the beam path and the 12.4 V sine wave is applied to the sample. The resulting electro-optic coefficient ($r_{33}$) is 1.8 pm/V.

EXAMPLE 5

A. Preparation of a Film of a Polymer of II/D.E.R.* 332 (VI)

A mixture of II (1.026 g, 4.04 meq), D.E.R.* 332 (0.689 g, 4.01 meq), ethyltriphenylphosphonium iodide (10.7 mg) and DOWANOL* DPM/cyclohexanone (5 mL/5 mL) is prepared in a reaction vial. After degassing with nitrogen for ~1 hour, the solution is heated at 115° C. for ~3 hours. The resulting solution is a dark reddish-orange color and is used for spin coating films onto ITO substrates. Films are cast by spin coating: 1) spread cycle=500 rpm for 5 seconds and 2) spin cycle=1000 rpm for 20 seconds.

The films are air dried for ~48 hours and dried in a $N_2$ purged clean room oven at 100° C. for 2 hours. The films are then dried in a vacuum oven for 2 hours at 100° C. and 1 hour at 150° C. Finally, the films are dried for 2 hours at 190° C. and 1 hour at 210° C. in a nitrogen purged oven.

B. Thermal Stability

The thermal stability of VI is determined by monitoring the absorption band of the 4-nitro-4'-hydroxy stilbene with aging in a 150° C. forced air oven. The absorbance at 465 nm was monitored as the polymer film aged at 150° C. Films are mounted on holders which can be reproducibly placed in the sample chamber of a Shimadzu UV-3101PC spectrophotometer which is computer controlled by an IBM AT personal computer. Table 1 shows the aging data for VI.

TABLE 1

| Aging Data for VI at 150° C. in Air. | |
|---|---|
| # Days at 150° C. in Air | Absorbance at 465 nm |
| 0 | 1.69 |
| 1 | 1.47 |
| 2 | 1.51 |
| 3 | 1.49 |
| 37 | 1.40 |

The data can be quantitated by fitting the absorbance (A) vs time (t) data to a first order rate equation:

$$A = A_0 + e^{-kt}$$

where $A_0$ is the absorbance at time t=0 and 1/k is the reported 1/e decay time. Fitting the data in Table 1 to this equation yields a 1/e decay time of 351 days.

Comparative Experiment A

Thermal Stability of a Film of Epoxy NLO Polymer

To demonstrate the excellent thermal stability of the mesogenic novolacs, we have compared the stability as measured by absorption spectroscopy of VI with another epoxy NLO polymer (VII).

A. Preparation of a Film of a Polymer of a Cresol Epoxy Novolac Resin/4 -Nitrophenylhydrazone of 4,4'-Diaminobenzophenone (VII)

To a mixture of a cresol epoxy novolac resin (10.38 g, 0.052 eq) and 4-nitrophenylhydrazone of 4,4'-diaminobenzophenone (4.52 g, 0.052 eq) is added freshly distilled tetrahydrofuran (THF) (70 mL). The solvent is allowed to evaporate in air for ~48 hours. The resulting mixture was placed in a vacuum oven. The temperature was maintained at ~50° C. under ~30" Hg vacuum for 8 hours. The resulting solid product was soluble in common organic solvents such as THF, diglyme, and dimethylacetamide (DMAc). Films are prepared from a DMAc solution by spin coating for 40 seconds at 1000 rpm.

The films are air dried for 48 hours and dried in a $N_2$ purged clean room oven at 100° C. for 2 hours. The films are then dried in a vacuum oven for 2 hours at 100° C. and 1 hour at 150° C. Finally, the films are dried at 180° C. for 1 hour and 210° C. for 1 hour in a $N_2$ purged oven. The resulting films are about 2 μm thick as measured using a Tencor Instruments Alpha Step 200 profilimeter.

B. Thermal Stability

The thermal stability of VII is determined at 150° C. in air in the same manner as for VI. Table 2 shows the absorbance vs time aging data for VII.

TABLE 2

| Aging Data for VII at 150° C. in Air. | |
|---|---|
| # Days at 150° C. in Air | Absorbance at 442 nm |
| 0 | 3.37 |
| 1 | 3.20 |
| 2 | 3.06 |
| 3 | 2.88 |
| 6 | 2.48 |
| 13 | 1.82 |
| 15 | 1.66 |
| 17 | 1.55 |
| 20 | 1.40 |
| 29 | 1.13 |

TABLE 2-continued

Aging Data for VII at 150° C. in Air.

| # Days at 150° C. in Air | Absorbance at 442 nm |
|---|---|
| 42 | 1.00 |

Fitting the data in Table 2 to the first order rate equation yields a 1/e decay time of 32 days.

EXAMPLE 6

A. Synthesis of 4-Hydroxystilbene

A portion (244.24 grams, 2.0 moles) of 4-hydroxybenzaldehyde, phenylacetic acid (272.30 grams, 2.0 moles) and piperidine (51.6 milliliters) are added to a reactor equipped with a reflux condenser and stirred under a nitrogen atmosphere. Heating commences and after 12 minutes and at 93° C., a solution forms. After a total of 27 minutes, the reaction temperature reaches 150° C. and is held therein. After 2 hours at the 150° C. temperature, a solution of sodium carbonate (40.0 grams) in deionized water (800 milliliters) is added to the reactor over a 3 minute period while stirring and heating are maintained. After 10 minutes of mixing with heating, stirring ceases and the aqueous layer is decanted from the reactor. The solid product remaining in the reactor is recovered and dissolved in a solution of sodium hydroxide (100.0 grams) in deionized water (2400 milliliters) which has been heated to 90° C. The resultant solution is held for 16 hours at 4° C. and the resultant crystalline precipitate which forms is recovered by filtration. The crystals are suspended in deionized water (1600 milliliters) which is stirred and then acidified to a pH of one by addition of aqueous concentrated hydrochloric acid. The resultant crystalline product is recovered by filtration, then washed on the filter with deionized water (two 250 milliliter portions). The product recovered on the filter is dried at 80° C. under a vacuum of 2 mm Hg to a constant weight of 87.1 grams of white crystalline powder. Fourier transform infrared spectrophotometric analysis of a potassium chloride pellet of the product reveals the presence of the expected hydroxyl group O—H stretching absorbance centered at 3416 cm$^{-1}$ (broad), the ethylene C—H out-of-plane deformation at 965 cm$^{-1}$, the C—H out-of-plane vibration at 819 cm$^{-1}$ for the para substituted aromatic ring and the C—H out-of-plane vibration at 746 and 686 cm$^{-1}$ for the monosubstituted aromatic ring. High pressure liquid chromatographic analysis of the 4-hydroxystilbene product using a uv detector set at 254 nm reveals a single sharp peak. Proton magnetic resonance spectroscopy further confirms the product structure.

B. Synthesis of 4-Hydroxystilbene Novolac

A portion (0.10 mole, 19.62 grams) of the 4-hydroxystilbene from A above and 90% formic acid (250 milliliters) are added to a reactor equipped with a chilled (5° C.) glycol condenser and stirred as a slurry under a nitrogen atmosphere. Concentrated hydrochloric acid (0.39 gram) is added, then heating commences. Once the reaction temperature reaches 45° C., 37% aqueous formaldehyde (4.06 grams) is added dropwise over a 30 minute period. After 23.5 hours at 45° C., a sample of the reaction mixture is removed and analyzed by high pressure liquid chromatography ($C_{18}$ column, 254 nm uv detector, 45%/55% acetonitrile/deionized water initial eluent to 100% acetonitrile final eluent at 0.7 milliliter per minute over 10 minutes total program time using a linear gradient) and demonstrates complete conversion of the 4-hydroxystilbene to the novolac. At this time, the reaction product is rotary evaporated using final conditions of 120° C. and 1 mm Hg vacuum to a constant weight of 21.11 grams of tan powder. Gel permeation chromatographic analysis (10$^3$ angstrom, 500 angstrom and 100 angstrom columns of polystyrene crosslinked with divinylbenzene, refractive index detector, tetrahydrofuran eluent at 1.0 milliliter per minute) of a portion of the novolac product is completed using calibration based on polystyrene standards with molecular weights of 2980 and 9110 plus 4-hydroxystilbene. Using this method, analysis of the 4-hydroxystilbene provides a number average molecular weight of 193, a weight average molecular weight of 194, a molecular weight at peak maximum of 195 and a polydispersity of 1.00. Analysis of the novolac product provides a number average molecular weight of 1400, a weight average molecular weight of 2320, a molecular weight at peak maximum of 1690 and a polydispersity of 1.65. A hydroxyl equivalent weight of 208.25 was calculated based on the gel permeation chromatographic analysis. Fourier transform infrared spectrophotometric analysis of a potassium chloride pellet of the novolac reveals the presence of the expected hydroxyl group O—H stretching absorbance centered at 3409 cm$^{-1}$ (broad), the ethylene C—H out-of-plane deformation at 965 cm$^{-1}$ and C—H out-of-plane vibrations for the aromatic rings at 832, 759 and 700 cm$^{-1}$. Proton magnetic resonance spectroscopy further confirms the product structure.

C. Synthesis of 4-Hydroxystilbene Novolac Epoxy Resin

A portion (5.21 grams) of the 4-hydroxystilbene novolac from B above, epichlorohydrin (115.67 grams, 1.25 moles) and tetra-n-butylammonium bromide (0.0521 gram) are added to a glass three necked round bottom reactor and stirred under a nitrogen atmosphere as a solution. Heating commences until a temperature of 75° C. is achieved and this temperature is maintained for the next 7 hours. At this time, a water separator is interspersed between the reactor and the chilled (− 2.5° C. ) glycol condenser and an addition funnel containing sodium hydroxide (1.125 gram, 0.0281 mole) dissolved in deionized water (1.38 gram, 55% wt. of the solution) and a vacuum line are added to the reactor. The nitrogen purge is shut off simultaneously with the initiation of the vacuum. The vacuum and reaction temperature are equilibrated at 54° C. and 68 mm Hg, respectively, and such that a vigorous reflux is maintained with continuous return of dry epichlorohydrin from the water separator. After equilibration, dropwise addition of the aqueous sodium hydroxide commences with maintenance of the reaction temperature and vacuum. After 12 minutes, addition of the aqueous sodium hydroxide is complete. After an additional 4 hours at the aforementioned reaction temperature and vacuum, heating ceases and the recovered warm product slurry is filtered through a bed of diatomaceous earth. The recovered filtrate is added to a separatory funnel then washed with deionized water (100 milliliters). The recovered organic layer is rotary evaporated using final conditions of 110° C. and 1 mm Hg vacuum to a constant weight of 5.10 grams of a light tan powder. Titration of a portion of this product reveals the presence of 12.05 percent epoxide (357.15 epoxide equivalent weight). Fourier transform infrared spectrophotometric analysis of a potassium chloride pellet of the novolac reveals the presence of hydroxyl group O—H stretching absorbance centered at 3462 cm$^{-1}$ (broad), aromatic ring C═C stretching vibration at 1497 cm$^{-1}$ (sharp), the ethylene C—H out-of-plane deformation at 965 cm$^{-1}$, epoxide ring C—O stretching vibrations at 912 and 832 cm$^{-1}$ (a shoulder at 859 cm$^{-1}$, due to the C—H out-of-plane vibrations for the aromatic rings is present on the absorbance at 832 cm$^{31\ 1}$).

D. Analysis of 4-Hydroxystilbene Novolac Epoxy Resin for Liquid Crystallinity

A portion of the 4-hydroxystilbene novolac epoxy resin from C above is analyzed at 70×magnification under crosspolarized light by heating on the hot stage of an optical microscope at a rate of 10° C. per minute to 200° C., followed by cooling at a rate of 10° C. per minute. The following visual observations results are made:

| Temp. (°C.) | Observation |
| --- | --- |
| 30 | Light yellow solid, low level of birefringence |
| 110 | Slight softening occurs |
| 139 | Viscous, non-birefringent melt |
| 200 | Lower viscosity, non-birefringent melt, begin cooling |
| 150 | Viscous, transparent, non-birefringent melt, unchanged when sheared |
| 30 | Light yellow solid, low level of birefringence |

EXAMPLE 7

Preparation of Curable Blend and Curing of 4-Hydroxystilbene Novolac Epoxy Resin with 4,4'-Diaminodiphenyl sulfone A portion (0.2865 gram, 0.000802 epoxide equivalent) the 4-hydroxystilbene novolac epoxy resin from Example 3-C above and 4,4'-diaminodiphenyl sulfone (0.0498 grams, 0.000802 amine hydrogen equivalent) are ground together in a mortar to a homogeneous, fine powder. A portion of the curable blend is analyzed at 70×magnification under crosspolarized light by heating on the hot stage of an optical microscope at a rate of 10° C. per minute to 170° C. and held at this temperature until cured. The following visual observations results are made:

| Temp. (°C.) | Observation |
| --- | --- |
| 30 | Off-white solid |
| 125 | Slight softening occurrs |
| 129 | Melting starting to occur |
| 133 | Partial melt containing dispersed crystals |
| 170 | All crystals have cleared., viscous, transparent, non-birefringent melt |
| 170 | Three minutes past, resin thickens, non-birefringent |
| 170 | Nine minutes past, near gel point, non-birefringent |
| 170 | Twelve minutes past, barely mobile, non-birefringent |
| 170 | Fourteen minutes past, rubbery solid, non-birefringent |

When cooled to room temperature, the resin is a transparent solid with a low level of birefringence.

Differential scanning calorimetry of portions (11.7 and 12.5 milligrams) of the curable blend using a heating rate of 10° C. per minute for 30° to 260° C under a stream of nitrogen flowing at 35 cubic centimeters per minute reveals a cure exotherm with a maximum at 229.7° C. with an enthalpy of 159.5 joules per gram (average of two samples).

The remaining curable blend in an aluminum pan is placed in an oven which has been preheated to 170° C. Melting occurred after one minute and the resin is stirred. A viscous homogeneous melt is obtained after three minutes at 170° C. After five minutes at 170° C., the resin is near the gel point. After thirteen minutes at 170° C., fibers could be drawn from the resin on a cold spatula and exhibit a low level of birefringence at room temperature when observed by microscopy at 70×magnification under crosspolarized light. After twenty minutes, the resin thermosets. After two hours at 170° C., the temperature is increased to 200° C. and held therein for the next four hours. The casting recovered after this time is translucent, light yellow and exhibits a low level of birefringence at room temperature when observed by microscopy at 70×magnification under crosspolarized light, with Schlieren textures observed in some areas of the casting. Differential scanning calorimetry of portions (40.0 and 80.0 milligrams) of the casting reveal a glass transition temperature of 232.1° C. which is followed by an exothermic rise. Further post curing of the casting at 250° C. for two hours followed by differential scanning calorimetry of portions (60.0 and 60.0 milligrams) of the casting reveals no detectable glass transition temperature and an exothermic rise with an onset at 262.4° C. (average of two samples). The recovered casting is dark reddish brown and exhibits a low level of birefringence at room temperature when observed by microscopy at 70×magnification under crosspolarized light.

EXAMPLE 8

Preparation of Curable Blend and Curing of 4-Hydroxystilbene Novolac Epoxy Resin with 4-Hydroxystilbene Novolac with Catalyst A portion (0.8633 grams, 0.00242 epoxide equivalent) the 4-hydroxystilbene novolac epoxy resin from Example 3-C above and 4-hydroxystilbene novolac from Example 3-B above (0.5862 grams, 0.00242 hydroxyl equivalent) are added to acetone (50 milliliters) containing tetra-n-butylphosphonium fluoroborate (40 percent weight solution in methanol) catalyst (0.048 milliequivalents) and stirred to a solution. The acetone is allowed to evaporate from the solution under ambient conditions followed by complete devolatilization at 70° C. under a vacuum of 1 mm Hg for one hour. A portion of the curable blend is analyzed at 70× magnification under crosspolarized light by heating on the hot stage of an optical microscope at a rate of 10° C. per minute to 220° C. and held at this temperature until cured. The following visual observations results are made:

| Temp. (°C.) | Observation |
| --- | --- |
| 30 | Light tan solid |
| 140 | Slight softening occurs |
| 150 | Melting starting to occur, powder has fused together |
| 133 | Partial melt containing dispersed crystals |
| 160 | Partial melt, translucent, non-birefringent |
| 168 | Starting to solidify, non-birefringent |
| 175 | Opaque solid, birefringent |
| 220 | Opaque solid, birefringent |

When cooled to room temperature, the resin is an opaque, birefringent solid.

A second portion of the curable blend is analyzed at 70× magnification under crosspolarized light by heating on the hot stage of an optical microscope preheated to 160° C. The following visual observations results are made:

| Temp. (°C.) | Observation |
| --- | --- |
| 1 | Translucent melt, non-birefringent |
| 3 | Starting to solidify and turn opaque |
| 6 | Opaque, birefringent solid |
| 10 | Unchanged appearance (opaque, birefringent solid) |

When cooled to room temperature, the resin is an opaque, birefringent solid.

Differential scanning calorimetry of portions (13.5 and 14.0 milligrams) of the curable blend using a heating rate of 10° C. per minute for 30° to 260° C. under a stream of nitrogen flowing at 35 cubic centimeters per minute reveals a cure exotherm with a maximum at 177.8° C. with an enthalpy of 70.7 joules per gram (average of two samples).

The remaining curable blend in an aluminum pan was placed in an oven which has been preheated to 160° C. Softening and fusing occur after two minutes to provide an opaque product. After four minutes, the resin thermosets. After 116 minutes at 160° C., the temperature is increased to 200° C. and held therein for the next four hours. The casting recovered after this time is opaque, reddish brown and exhibits a low level of birefringence at room temperature when observed by microscopy at 70×magnification under crosspolarized light. Differential scanning calorimetry of portions (30.0 and 30.0 milligrams) of the casting reveals a glass transition temperature of 203.3° C. A second scanning reveals a glass transition temperature of 212.2° C. (average of two samples).

What is claimed is:

1. A composition comprising (A) a compound represented by the following Formula I:

Formula I

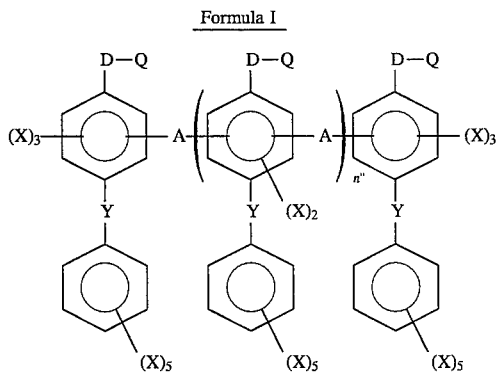

wherein A is a divalent $C_1$-$C_{12}$ aliphatic or cycloaliphatic hydrocarbyl group, D is O or NR with the proviso that when R in NR is hydrogen then Q is hydrogen or cyanamide; Q is hydrogen, epoxy, thiirane, vinylester, cyanamide, or cyanate; n" has a value from 1.01 to about 10; X is hydrogen, a hydrocarbyl or hydrocarbyloxy group having from one to about 10 carbon atoms, a halogen atom, a nitro group, a phenyl group, a ketone group, an ester group, a carboxyl acid group with the proviso that when X is a carboxyl group Q is hydrogen, —$SO_2R$, —$SO_2CH_2F$, —$SO_2CHF_2$, —$SO_2CF_3$, —$S(NSO_2CF_3)CF_3$, —$CF_3$, —$COCF_3$, cyano, cyanovinyl, dicyanovinyl, tricyanovinyl; with the proviso that only one X can be a group other than hydrogen; R is hydrogen or a $C_1$ to $C_{20}$ hydrocarbyl group; and Y is a rigid central linkage group selected from the group consisting of —$CR^1$=$CR^1$—, —C≡C—, —N=N—, —$CR^1$=N—, —N=$CR^1$—, —O—CO—, —CO—O—, —$NR^1$—CO—, —CO—$NR^1$—, —$CR^1$=N—N=$CR^1$—, —CO—O—N=$CR^1$, —$CR^1$=N—O—CO—, —CO—$NR^1$—$NR^1$—OC—, —$CR^1$=$CR^1$—O—OC—, —CO—O—$CR^1$=$CR^1$—, —O—OC—$CR^1$=$CR^1$—, —$CR^1$=$CR^1$—CO—O—, —(CHR$^1$)$_n$—O—CO—$CR^1$=$CR^1$—, —$CR^1$=$CR^1$—CO—O—(CHR$^1$)$_n$—, —(CHR$^1$)$_n$—CO—O—$CR^1$=$CR^1$—, —$CR^1$=$CR^1$—O—CO—(CHR$^1$)$_n$—, —S—CO—, —CO—S—, —$CH_2$—$CH_2$—CO—O—, —O—OC—$CH_2$—$CH_2$—, —C≡C—C≡C—, —$CR^1$=$CR^1$—$CR^1$=$CR^1$—, —$CR^1$=C(—Cl)—, —C(—Cl)=$CR^1$—, —$CR^1$=C(—C≡N)—, —C(—C≡N)=$CR^1$—, —C(—C≡N)=N—, —N=C(—C≡N)—, —C≡C—CO—O—, —O—CO—C≡C—

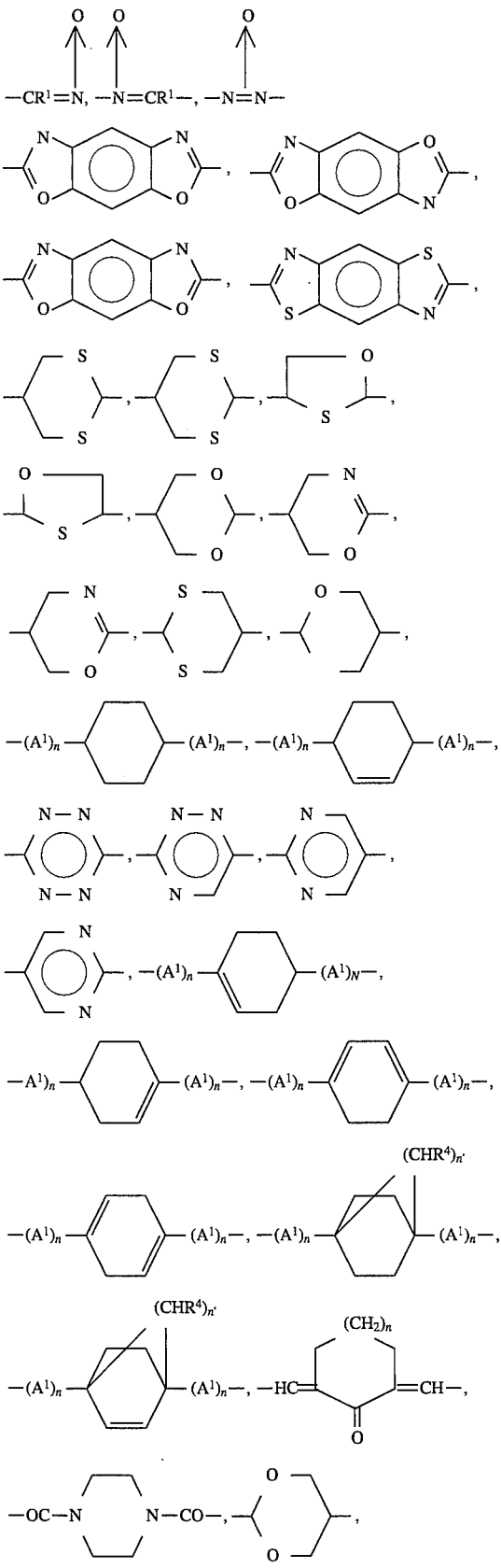

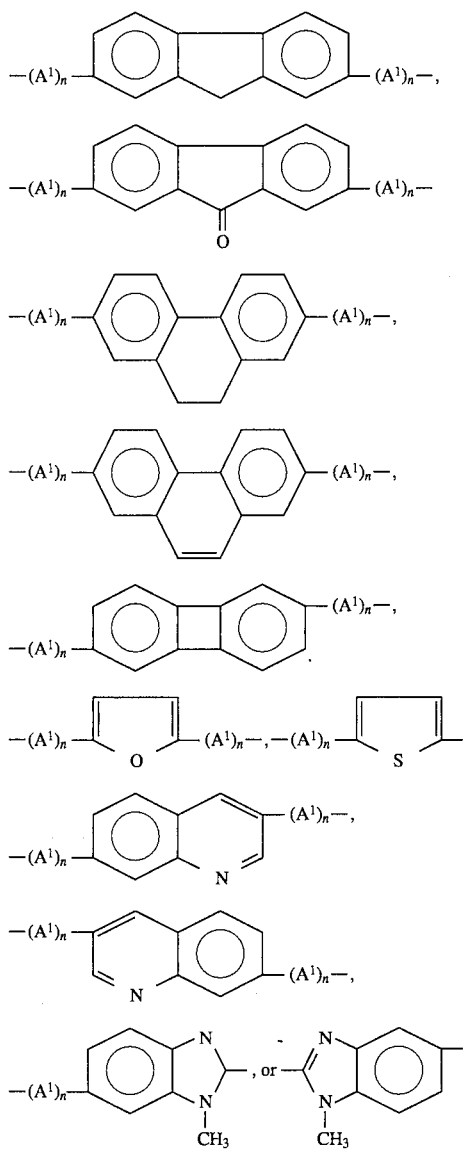

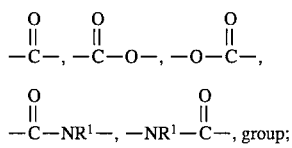

each $A^1$ is independently a $-\overset{O}{\underset{\|}{C}}-$, $-\overset{O}{\underset{\|}{C}}-O-$, $-O-\overset{O}{\underset{\|}{C}}-$, $-\overset{O}{\underset{\|}{C}}-NR^1-$, $-NR^1-\overset{O}{\underset{\|}{C}}-$, group;

each $R^1$ is independently hydrogen or a hydrocarbyl group having from one to about 3 carbon atoms; $R^4$ is hydrogen or a methyl group; n has a value of zero or one; and n' has a value of 1 or 2; and (B) optionally, a curing amount of a curing agent or a catalytic amount of a polymerization catalyst and/or a cure accelerating amount of an accelerating agent.

2. The composition of claim 1 wherein in component (A), one X of the $(X)_5$ substituents is an electron withdrawing group and is para to Y and the other X's are hydrogen, and is para to Y; Y is a divalent conjugated rigid central linkage group; and the composition exhibits nonlinear optical properties upon orientation.

3. The composition of claim 2, wherein the electron-withdrawing group, X, is selected from the group consisting of $-NO_2$, $-SO_2R$, $-SO_2CH_2F$, $-SO_2CHF_2$, $-SO_2CF_3$, $-S(NSO_2CF_3)CF_3$, $-CF_3$, $-CO_2R$, $-COCF_3$, cyano, cyanovinyl, dicyanovinyl, and tricyanovinyl.

4. The composition of claim 2, wherein the divalent conjugated group, Y, is selected from the group consisting of $-C\equiv C-$, $-CR^1=CR^1-$, $-CR^1=CR^1-CR^1=CR^1-$, $-C\equiv C-C\equiv C-$, $-CR^1=N-$, $-N=CR^1-$, and $-N=N-$; and $R^1$ is hydrogen.

5. The composition of claim 1, wherein component (B) is not present and Q is a hydrogen atom or an epoxy group.

6. The composition of claim 5 which is the novolac of 4-hydroxystilbene, and formaldehyde, wherein A is $-CH_2-$; D is oxygen; Q is hydrogen; each X is hydrogen; Y is $-CR^1=CR^1-$; and $R^1$ is hydrogen.

7. The composition of claim 5 which is the epoxidized novolac of 4-hydroxystilbene and formaldehyde, wherein A is $-CH_2-$; D is oxygen; Q is an epoxy group; each X is hydrogen; Y is $-CR^1=CR^1-$; and $R^1$ is hydrogen.

8. The composition of claim 2, wherein Q is hydrogen or an epoxy group.

9. A composition of claim 8, which is the novolac of 4-nitro-4'-hydroxystilbene and formaldehyde, wherein A is $-CH_2-$; D is oxygen, Q is hydrogen, one X from $(X)_5$ is a nitro group in the para position with respect to Y and the other X's are hydrogen, Y is $-CR^1=R^1-$; and $R^1$ is hydrogen.

10. A composition of claim 8 which is the epoxidized novolac of 4-nitro-4'-hydroxystilbene and formaldehyde, wherein A is a $-CH_2-$; D is oxygen, Q is an epoxy group, one X from $(X)_5$ is a nitro group in the para position with respect to Y and the other X'S are hydrogen, Y is $-CR^1=R^1-$; and $R^1$ is hydrogen.

11. A composition of claim 8 which has been oriented.

12. A device comprising an oriented composition of claim 2.

13. A device comprising an oriented composition of claim 9.

* * * * *